United States Patent
Akiyama et al.

(10) Patent No.: US 10,352,024 B2
(45) Date of Patent: Jul. 16, 2019

(54) BULLDOZER

(71) Applicant: KOMATSU LTD., Tokyo (JP)

(72) Inventors: Naoya Akiyama, Tokyo (JP); Hiroaki Takeshima, Tokyo (JP)

(73) Assignee: KOMATSU LTD., Tokyo (JP)

( * ) Notice: Subject to any disclaimer, the term of this patent is extended or adjusted under 35 U.S.C. 154(b) by 21 days.

(21) Appl. No.: 15/751,177

(22) PCT Filed: Oct. 4, 2016

(86) PCT No.: PCT/JP2016/079475
§ 371 (c)(1),
(2) Date: Feb. 8, 2018

(87) PCT Pub. No.: WO2017/061420
PCT Pub. Date: Apr. 13, 2017

(65) Prior Publication Data
US 2018/0230676 A1    Aug. 16, 2018

(30) Foreign Application Priority Data
Oct. 9, 2015 (JP) .................. 2015-200840

(51) Int. Cl.
*E02F 9/22* (2006.01)
*B62D 11/08* (2006.01)
(Continued)

(52) U.S. Cl.
CPC .............. *E02F 9/225* (2013.01); *B60T 11/21* (2013.01); *B62D 11/08* (2013.01); *E02F 3/80* (2013.01);
(Continued)

(58) Field of Classification Search
CPC ............ E02F 9/225; E02F 9/2087; E02F 3/80; B60T 11/21; B62D 11/08; F16D 25/0638; F16D 55/40
(Continued)

(56) References Cited

U.S. PATENT DOCUMENTS 2,769,394 A * 11/1956 Lauck ..................... F16H 61/40
                                                                     236/35
2,902,004 A * 9/1959 Zarnack ................. B62D 11/08
                                                                     60/455

(Continued)

FOREIGN PATENT DOCUMENTS

JP      2002-266997 A    9/2002
JP      2003-34263 A     2/2003
(Continued)

OTHER PUBLICATIONS

The International Search Report for the corresponding international application No. PCT/JP2016/079475, dated Dec. 27, 2016.

*Primary Examiner* — Jacob D Knutson
(74) *Attorney, Agent, or Firm* — Global IP Counselors, LLP

(57) ABSTRACT

A bulldozer includes a steering clutch, a steering brake, a hydraulic pump that discharges a lubricating oil, a first lubricating oil supply path, a second lubricating oil supply path, a third lubricating oil supply path, and a flow amount switching valve disposed on the second lubricating oil supply path. The first lubricating oil supply path supplies a portion of the lubricating oil discharged by the hydraulic pump to the steering clutch The second lubricating oil supply path supplies a portion of the lubricating oil discharged by the hydraulic pump to the steering brake. The third lubricating oil supply path supplies, to the steering brake, a portion of the lubricating oil that has passed through (Continued)

the steering clutch. The flow amount switching valve switches an amount of the lubricating oil supplied to the steering brake.

3 Claims, 3 Drawing Sheets

(51) Int. Cl.
    *F16D 55/40*           (2006.01)
    *F16D 25/0638*      (2006.01)
    *B60T 11/21*           (2006.01)
    *E02F 3/80*            (2006.01)
    *E02F 9/20*            (2006.01)

(52) U.S. Cl.
    CPC ........ *E02F 9/2087* (2013.01); *F16D 25/0638* (2013.01); *F16D 55/40* (2013.01)

(58) Field of Classification Search
    USPC .......................................................... 180/6.2
    See application file for complete search history.

(56) References Cited

U.S. PATENT DOCUMENTS

| | | | | |
|---|---|---|---|---|
| 2,941,639 A * | 6/1960 | Breting | ................. | B62D 11/08 137/625.11 |
| 3,080,026 A * | 3/1963 | Koch | ................... | B62D 11/08 192/13 R |
| 3,174,362 A * | 3/1965 | Fisher | ................... | B62D 11/10 475/20 |
| 3,324,963 A * | 6/1967 | Stroot | ................... | B62D 12/02 180/14.2 |
| 3,841,450 A * | 10/1974 | Drone | ................... | B60T 13/22 192/13 R |
| 3,917,013 A * | 11/1975 | Orr | ....................... | B62D 11/08 180/6.7 |
| 4,037,677 A * | 7/1977 | Koch | .................... | B60T 13/22 180/6.7 |
| 4,042,052 A * | 8/1977 | Koch | .................... | B62D 11/08 180/6.7 |
| 4,336,869 A * | 6/1982 | Tsutsumi | ............... | B62D 11/08 192/12 C |
| 4,494,621 A * | 1/1985 | Nagata | .................. | B62D 11/08 137/596 |
| 4,633,960 A * | 1/1987 | Horsch | .................. | B62D 11/08 180/6.7 |
| 5,375,686 A * | 12/1994 | Yamamoto | ............ | B62D 11/08 180/6.2 |
| 2011/0214952 A1 | 9/2011 | Fujino et al. | | |
| 2015/0204359 A1 | 7/2015 | Wu | | |
| 2017/0182884 A1* | 6/2017 | Jeong | ................ | B60L 15/2054 |
| 2018/0118261 A1* | 5/2018 | Sasada | ..................... | B60T 8/00 |

FOREIGN PATENT DOCUMENTS

| | | | | |
|---|---|---|---|---|
| JP | 2010-143259 A | | 7/2010 | |
| JP | 2010143259 A | * | 7/2010 | ............... B60T 5/00 |
| JP | 2011-93430 A | | 5/2011 | |
| JP | 2015-31165 A | | 2/2015 | |
| JP | 2015-137714 A | | 7/2015 | |

\* cited by examiner

BULLDOZER

CROSS-REFERENCE TO RELATED APPLICATIONS

This application is a U.S. National stage application of International Application No. PCT/JP2016/079475, filed on Oct. 4, 2016. This U.S. National stage application claims priority under 35 U.S.C. § 119(a) to Japanese Patent Application No. 2015-200840, filed in Japan on Oct. 9, 2015, the entire contents of which are hereby incorporated herein by reference.

BACKGROUND

Field of the Invention

The present invention relates to a bulldozer.

Description of the Related Art

Conventionally, power from an engine is transmitted through a transmission to left and right drive wheels, and left and right crawlers are driven by the drive wheels in a bulldozer. This type of bulldozer is provided with a steering clutch and a steering brake in correspondence with the respective left and right drive wheels. Turning of the bulldozer is conducted by controlling the left and right steering clutches and steering brakes with hydraulic pressure (see, for example, Japanese Laid-open Patent No. 2010-143259).

In Japanese Laid-open Patent No. 2010-143259, lubricating oil is supplied from a hydraulic pump to the steering clutch through a clutch lubricating oil supply path, and lubricating oil is supplied from the hydraulic pump to the steering brake through a brake lubricating oil supply path. The lubricating oil that has passed through the steering clutch and the lubricating oil that has passed through the steering brake is recovered in a lubricating oil tank.

SUMMARY

There is a demand to increase the amount of the lubricating oil supplied to the steering clutch and the steering brake, and increase the respective capacities of the steering clutch and the steering brake. Moreover, there may be a demand to reduce the amount of the lubricating oil supplied to the steering clutch and the steering brake, and reduce the capacity of the hydraulic pump. Accordingly, the effective use of the lubricating oil discharged from the hydraulic pump is desired.

An object of the present invention is to provide a bulldozer that is able to effectively use lubricating oil in consideration of the above problem.

A bulldozer according to a first aspect is provided with a steering clutch, a steering brake, a hydraulic pump, a first lubricating oil supply path, a second lubricating oil supply path, a third lubricating oil supply path, and a flow amount switching valve. The steering clutch transmits or cuts off the rotational force of an input shaft to an output shaft. The steering brake brakes the output shaft. The hydraulic pump discharges a lubricating oil. The first lubricating oil supply path supplies a portion of the lubricating oil discharged by the hydraulic pump to the steering clutch. The second lubricating oil supply path supplies a portion of the lubricating oil discharged by the hydraulic pump to the steering brake. The third lubricating oil supply path supplies a portion of the lubricating oil that has passed through the steering clutch to the steering brake. The flow amount switching valve is disposed on the second lubricating oil supply path and switches the amount of the lubricating oil supplied to the steering brake.

According to the bulldozer as in the first aspect, a portion of the lubricating oil that has been discharged by the hydraulic pump and that has passed through the steering clutch is supplied to the steering brake through the third lubricating oil supply path. Therefore, the lubricating oil discharged by the hydraulic pump can be used effectively because a portion of the lubricating oil supplied to the steering clutch can be reused in the steering brake.

A bulldozer according to a second aspect is related to the first aspect, and the steering clutch has a clutch housing coupled to the output shaft, a plurality of first clutch disks fixed to the clutch housing, and a plurality of second clutch disks that rotate with the input shaft. The steering brake has a brake housing, a plurality of fixed plates that are fixed to the brake housing, and a plurality of brake disks that rotate with the output shaft. The plurality of fixed plates and the plurality of brake disks are spaced further away from the input shaft than the plurality of first clutch disks and the plurality of second clutch disks in the radial direction perpendicular to the input shaft.

According to the bulldozer as in the second aspect, a first lubricating oil recovery path can be provided so as not to interfere with the steering brake.

A bulldozer according to a third aspect is related to the first aspect, and the steering clutch has a clutch housing coupled to the output shaft, a plurality of first clutch disks fixed to the clutch housing, and a plurality of second clutch disks that rotate with the input shaft. The steering brake has a brake housing, a plurality of fixed plates that are fixed to the brake housing, and a plurality of brake disks that rotate with the output shaft. The brake housing is spaced away from a center line in the axial direction of the plurality of first clutch disks and the plurality of second clutch disks in the axial direction parallel to the input shaft.

According to the bulldozer as in the third aspect, the lubricating oil that has passed through the steering clutch can be supplied effectively to the steering brake by using centrifugal force.

EFFECT OF THE INVENTION

According to the present invention, a bulldozer can be provided that uses lubricating oil effectively.

DETAILED DESCRIPTION OF EMBODIMENT(S)

(Overall Configuration of a Bulldozer 1)

Figure 1:
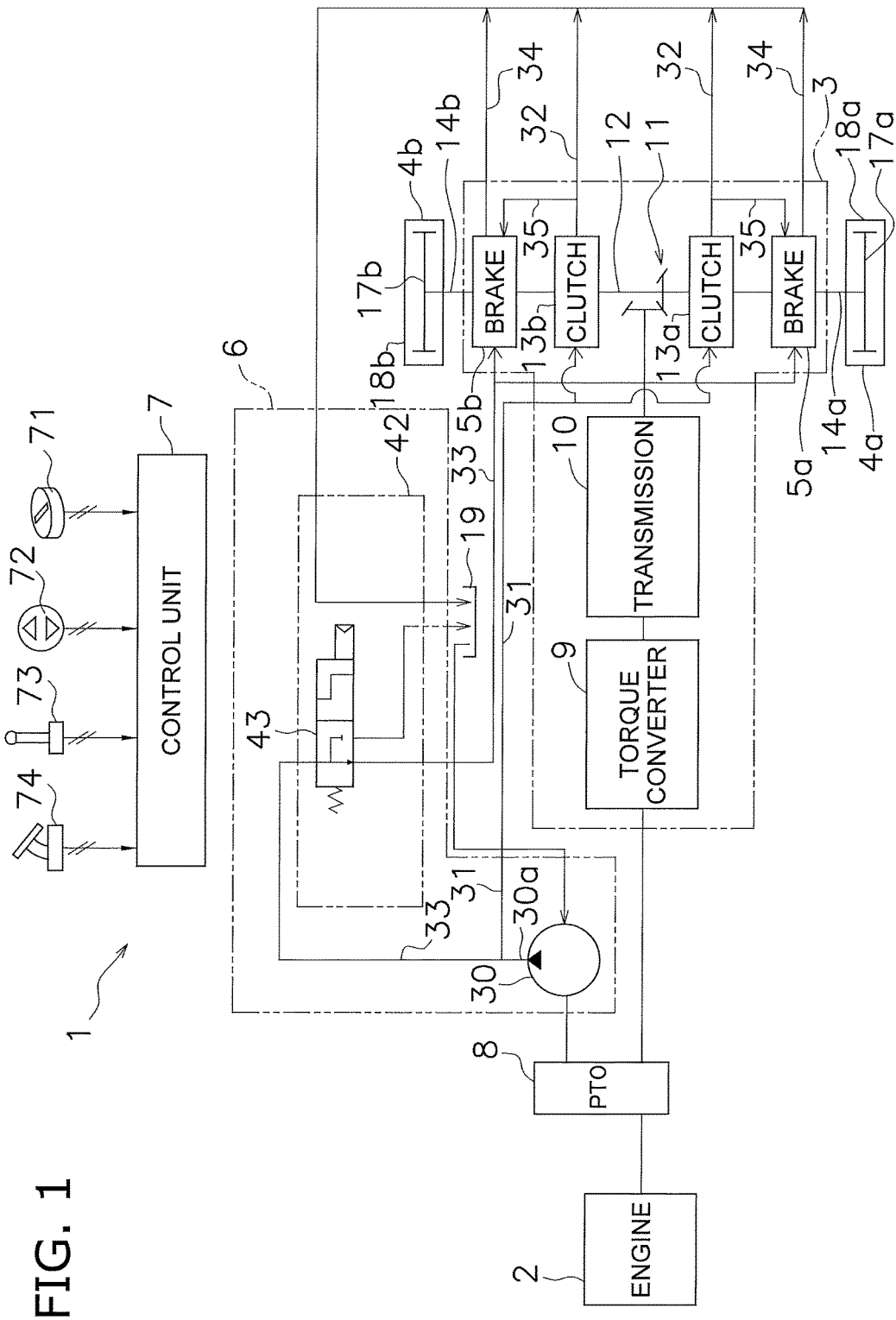
FIG. 1 is a system configuration of a bulldozer according to an embodiment.

FIG. 1 is a system configuration of a bulldozer 1 according to an embodiment. The bulldozer 1 is provided with an engine 2, a power transmission mechanism 3, a pair of travel devices 4a, 4b, a lubricating oil supply unit 6, a control unit 7, and a power take-off device 8.

Power from the engine 2 is transmitted to the power take-off device 8. The power take-off device 8 distributes the power from the engine 2 to the lubricating oil supply unit 6, the power transmission mechanism 3, and an unillustrated operating fluid pump. The operating fluid pump supplies operating fluid to a hydraulic cylinder for driving a work implement (a blade or a ripper and the like).

The lubricating oil supply unit 6 has a hydraulic pump 30, a lubricating oil tank 19, and a flow amount switching valve 43. In the present embodiment, the hydraulic pump 30 is a fixed displacement pump driven by power from the engine 2. The hydraulic pump 30 is driven by the engine 2. The hydraulic pump 30 sucks in lubricating oil stored in the lubricating oil tank 19 and discharges the lubricating oil to a discharge path 30*a*. The discharge path 30*a* is joined to a first lubricating oil supply path 31 and a second lubricating oil supply path 33. The lubricating oil discharged by the hydraulic pump 30 to the discharge path 30*a* is distributed to the first lubricating oil supply path 31 and the second lubricating oil supply path 33 in predetermined proportions. The predetermined proportions can be adjusted as appropriate with the respective opening diameters of the first lubricating oil supply path 31 and the second lubricating oil supply path 33.

The flow amount switching valve 43 is disposed on the second lubricating oil supply path 33. The flow amount switching valve 43 is an electromagnetic control valve controlled with control signals from the control unit 7. The flow amount switching valve 43 switches between an open state and a closed state in response to the presence or absence of an excitation current. The flow amount switching valve 43 enters the open state when a pair of below mentioned steering brakes 5*a*, 5*b* enter a braking state, and the flow amount switching valve 43 enters the closed state when the pair of steering brakes 5*a*, 5*b* enter a non-braking state. The lubricating oil that is discharged by the hydraulic pump 30 and flows into the second lubricating oil supply path 33 flows toward the pair of steering brakes 5*a*, 5*b* when the flow amount switching valve 43 is in the open state, and flows toward the recovery tank 19 when the flow amount switching valve 43 is in the closed state.

The power transmission mechanism 3 transmits the power from the engine 2 transmitted via the power take-off device 8, to the pair of travel devices 4*a*, 4*b*. The power transmission mechanism 3 has a torque converter 9, a transmission 10, a bevel gear 11, an input shaft 12, a pair of steering clutches 13*a*, 13*b*, a pair of output shafts 14*a*, 14*b*, and the pair of steering brakes 5*a*, 5*b*.

The torque converter 9 is coupled to the power take-off device 8 and the transmission 10. The torque converter 9 transmits the power from the power take-off device 8 to the transmission 10 through a fluid. The transmission 10 changes the speed of the rotation motion transmitted from the torque converter 9. The transmission 10 is able to switch between forward travel and reverse travel. The transmission 10 is coupled to the bevel gear 11. The power output from the transmission 10 is transmitted through the bevel gear 11 to the input shaft 12. The input shaft 12 is coupled to the pair of steering clutches 13*a*, 13*b*.

The pair of steering clutches 13*a*, 13*b* are wet multiplate clutches that can be switched between an engaged state and a released state with hydraulic pressure. The pair of steering clutches 13*a*, 13*b* are coupled to the pair of output shafts 14*a*, 14*b*. When the steering clutch 13*a* is in the engaged state, the power from the input shaft 12 is transmitted to the output shaft 14*a*. When the steering clutch 13*b* is in the engaged state, the power from the input shaft 12 is transmitted to the output shaft 14*b*. A configuration of the pair of steering clutches 13*a*, 13*b* is discussed below.

The first lubricating oil supply path 31 communicates with the pair of steering clutches 13*a*, 13*b* and the discharge path 30*a*. The first lubricating oil supply path 31 supplies a portion of the lubricating oil discharged by the hydraulic pump 30 to the pair of steering clutches 13*a*, 13*b*. A first lubricating oil recovery path 32 communicates with the pair of steering clutches 13*a*, 13*b* and the lubricating oil tank 19. The first lubricating oil recovery path 32 returns the lubricating oil that has passed through the pair of steering clutches 13*a*, 13*b* to the lubricating oil tank 19.

The pair of output shafts 14*a*, 14*b* are coupled to the pair of travel devices 4*a*, 4*b*. The travel device 4*a* has a sprocket 17*a* and a crawler belt 18*a*. The sprocket 17*a* is coupled to the output shaft 14*a*. The crawler belt 18*a* is wound onto the sprocket 17*a*. The sprocket 17*a* is rotated and driven by the output shaft 14*a* and the crawler belt 18*a* is driven as a result thereof. The travel device 4*b* has a sprocket 17*b* and a crawler belt 18*b*. The sprocket 17*b* is coupled to the output shaft 14*b*. The crawler belt 18*b* is wound onto the sprocket 17*b*. The sprocket 17*b* is rotated and driven by the output shaft 14*b* and the crawler belt 18*b* is driven as a result thereof.

The pair of steering brakes 5*a*, 5*b* are disposed between the pair of steering clutches 13*a*, 13*b* and the pair of travel devices 4*a*, 4*b*. The pair of steering brakes 5*a*, 5*b* are both wet multiplate negative brakes that can be switched between a braking state and a non-braking state with hydraulic pressure. The steering brake 5*a* brakes the rotation of the output shaft 14*a* in the braking state and does not brake the rotation of the output shaft 14*a* in the non-braking state. A configuration of the pair of steering brakes 5*a*, 5*b* is discussed below.

The second lubricating oil supply path 33 communicates with the pair of steering brakes 5*a*, 5*b* and the discharge path 30*a*. The second lubricating oil supply path 33 supplies a portion of the lubricating oil discharged by the flow amount switching valve 43 to the pair of steering brakes 5*a*, 5*b*. A second lubricating oil recovery path 34 communicates with the pair of steering brakes 5*a*, 5*b* and the lubricating oil tank 19. The second lubricating oil recovery path 34 returns the lubricating oil that has passed through the pair of steering brakes 5*a*, 5*b* to the lubricating oil tank 19.

A third lubricating oil supply path 35 communicates with the pair of steering clutches 13*a*, 13*b* and pair of steering brakes 5*a*, 5*b*. The third lubricating oil supply path 35 supplies a portion of the lubricating oil that has passed through the pair of steering clutches 13*a*, 13*b* to the pair of steering brakes 5*a*, 5*b*. Therefore, when the flow amount switching valve 43 is in the open state, lubricating oil is supplied from the second lubricating oil supply path 33 and the third lubricating oil supply path 35 respectively to the pair of steering brakes 5*a*, 5*b*. When the flow amount switching valve 43 is in the closed state, lubricating oil is supplied from the third lubricating oil supply path 35 to the pair of steering brakes 5*a*, 5*b*. In this way, lubricating oil is normally supplied from the third lubricating oil supply path 35 to the pair of steering brakes 5*a*, 5*b*.

The control unit 7 receives operation signals from a throttle operating unit 71, a speed change operating unit 72, a steering operating unit 73, and a brake operating unit 74. The throttle operating unit 71 outputs operation signals indicating the rotation speed of the engine 2. The speed change operating unit 72 outputs operation signals indicating the velocity stages of the transmission 10. The steering operating unit 73 outputs operation signals indicating switching between forward motion, reverse motion, and the turning direction of the bulldozer 1. The braking operating unit 74 outputs operation signals indicating the acceleration and deceleration of the bulldozer 1.

The control unit 7 sets the pair of steering brakes 5a, 5b to the braking state and sets the flow amount switching valve 43 to the closed state when operation signals are received from the brake operating unit 74. The control unit 7 sets the pair of steering brakes 5a, 5b to the non-braking state and sets the flow amount switching valve 43 to the closed state when no operation signals are received from the brake operating unit 74. The control unit 7 sets the pair of steering brakes 5a, 5b to the non-braking state and sets the flow amount switching valve 43 to the closed state when operation signals are not received from the brake operating unit 74.

The control unit 7 sets the steering brake 5a or the steering brake 5b to the braking state and sets the flow amount switching valve 43 to the open state when operation signals are received from the steering operating unit 73. The control unit 7 sets the pair of steering brakes 5a, 5b to the non-braking state and sets the flow amount switching valve 43 to the closed state when no operation signals are received from the steering operating unit 73.

(Configuration in the Vicinity of the Steering Clutch 13a and the Steering Brake 5a)

The following is an explanation of a configuration in the vicinity of the steering clutch 13a and the steering brake 5a with reference to the drawings. The configuration in the vicinity of the steering clutch 13a and the steering brake 5a is the same as the configuration in the vicinity of the steering clutch 13b and the steering brake 5b. Consequently, only the configuration in the vicinity of the steering clutch 13a and the steering brake 5a will be discussed below.

Figure 2:
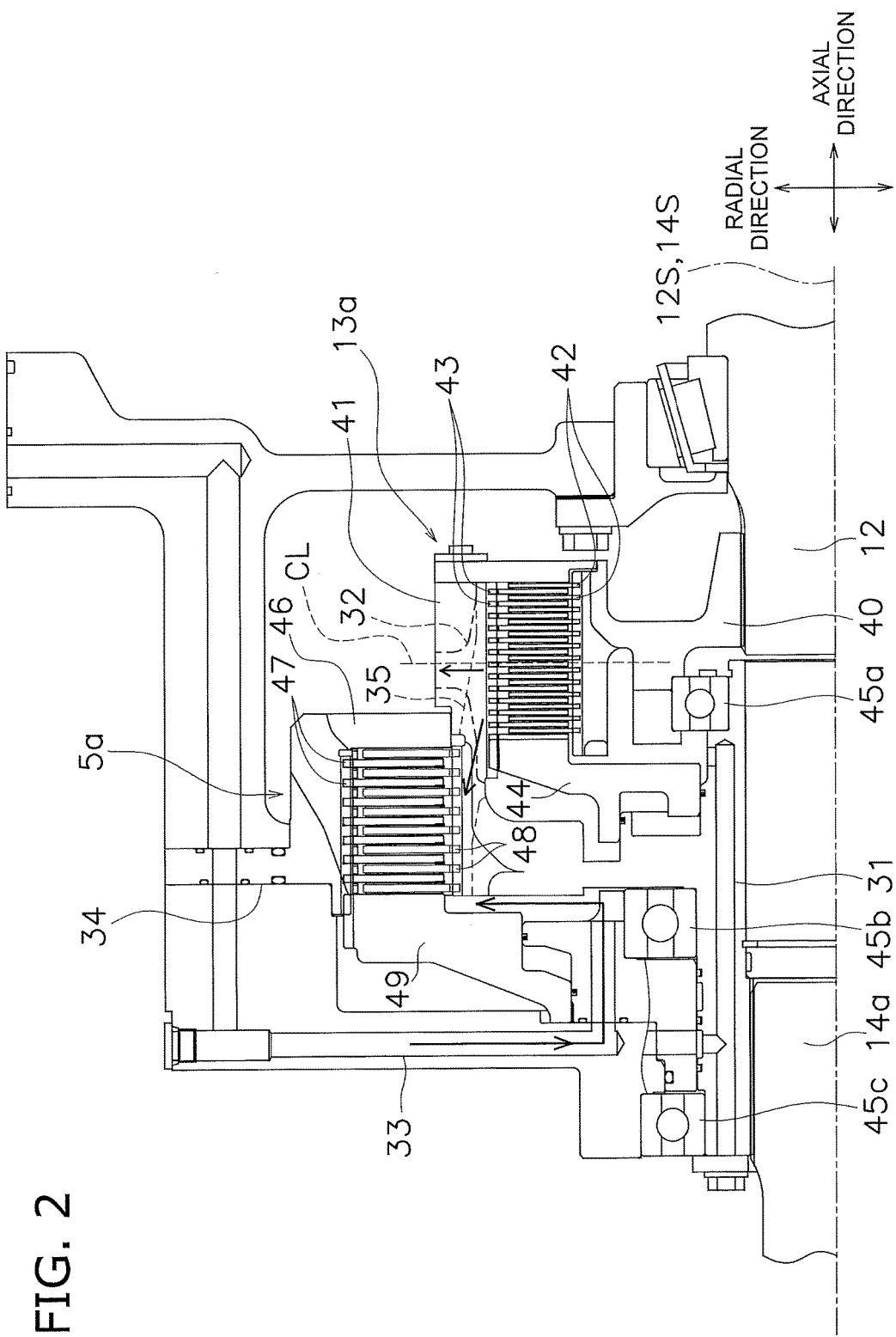
FIG. 2 is a cross-sectional view of a configuration in the vicinity of the steering clutch and the steering brake.

FIG. 2 is a cross-sectional view of the configuration in the vicinity of the steering clutch 13a and the steering brake 5a. The steering clutch 13a has a rotating member 40, a clutch housing 41, a plurality of first clutch disks 42, a plurality of second clutch disks 43, and a clutch piston 44.

The rotating member 40 is fixed to the input shaft 12 and rotates around a shaft center 12S of the input shaft 12. The clutch housing 41 surrounds the outside of the plurality of first clutch disks 42 and the plurality of second clutch disks 43. The plurality of first clutch disks 42 are fixed to the rotating member 40. The plurality of second clutch disks 43 are fixed to the clutch housing 41. The plurality of first clutch disks 42 and the plurality of second clutch disks 43 are disposed alternately in the axial direction parallel to the shaft center 12S of the input shaft 12.

The clutch housing 41 is coupled to the output shaft 14a. The clutch housing 41 is supported by a first shaft bearing 45a in a manner that allows relative rotation with respect to the rotating member 40. The clutch housing 41 is supported by a second shaft bearing 45b and a third shaft bearing 45c in a manner that allows relative rotation with respect to a below mentioned brake housing 46. When the steering clutch 13a is in an engaged state, the clutch housing 41 rotates around a shaft center 14S with the output shaft 14a. In the present embodiment, the shaft center 14S of the output shaft 14a matches the shaft center 12S of the input shaft 12.

When operating fluid is supplied to the clutch piston 44, the clutch piston 44 presses the plurality of first clutch disks 42 and the plurality of second clutch disks 43. Consequently, the steering clutch 13a enters the engaged state and the clutch housing 41 rotates around the shaft center 12S with the rotating member 40.

The steering brake 5a has the brake housing 46, a plurality of fixed plates 47, a plurality of brake disks 48, and a brake piston 49.

The brake housing 46 surrounds the outside of the plurality of fixed plates 47 and the plurality of brake disks 48. The brake housing 46 is spaced away from a center line CL in the axial direction of the plurality of first clutch disks 42 and the plurality of second clutch disks 43, in the axial direction parallel to the shaft center 14S of the output shaft 14a. The brake housing 46 does not overlap the center line CL of the plurality of first clutch disks 42 and the plurality of second clutch disks 43, in the radial direction perpendicular to the shaft center 14S of the output shaft 14a. While the brake housing 46 overlaps a portion of the plurality of first clutch disks 42 and the plurality of second clutch disks 43 in the radial direction in the present embodiment, the brake housing 46 may not overlap a portion of the plurality of first clutch disks 42 and the plurality of second clutch disks 43.

The plurality of fixed plates 47 are fixed to the brake housing 46. The plurality of plurality of brake disks 48 are fixed to the clutch housing 41. The plurality of plurality of fixed plates 47 and the plurality of brake disks 48 are disposed alternately in the axial direction parallel to the shaft center 14S of the output shaft 14a. The plurality of plurality of fixed plates 47 and the plurality of brake disks 48 are pressed by a disk spring which is not illustrated.

The plurality of fixed plates 47 and the plurality of brake disks 48 are spaced further away from the output shaft 14a than the plurality of first clutch disks 42 and the plurality of second clutch disks 43 in the radial direction perpendicular to the shaft center 14S of the output shaft 14a. The plurality of fixed plates 47 and the plurality of brake disks 48 are disposed further to the outside in the radial direction than the plurality of first clutch disks 42 and the plurality of second clutch disks 43. However, a portion of the plurality of fixed plates 47 and the plurality of brake disks 48 may overlap a portion of the plurality of first clutch disks 42 and the plurality of second clutch disks 43 in the radial direction.

When operating fluid is supplied to the brake piston 49, the brake piston 49 separates the plurality of fixed plates 47 and the plurality of brake disks 48 from each other. Consequently, the steering brake 5a enters the non-braking state.

The flow of the lubricating oil supplied to the steering clutch 13a and to the steering brake 5a will be explained below.

The lubricating oil discharged by the hydraulic pump 30 (see FIG. 1) is supplied to the steering clutch 13a through the first lubricating oil supply path 31. The lubricating oil that has passed through the steering clutch 13a is distributed in predetermined proportions to the first lubricating oil recovery path 32 and the third lubricating oil supply path 35 (see arrows in FIG. 2). The predetermined proportions can be adjusted as appropriate with the respective opening diameters of the first lubricating oil recovery path 32 and the third lubricating oil supply path 35. While four first lubricating oil recovery paths 32 and eight third lubricating oil supply paths 35 are provided in approximately equal intervals in the circumferential direction centered on the shaft center 12S of the input shaft 12 in the present embodiment, the numbers and positions of the first lubricating oil recovery path 32 and the third lubricating oil supply path 35 may be changed as appropriate.

The lubricating oil discharged by the hydraulic pump 30 is supplied to the steering brake 5a through the second lubricating oil supply path 33, and a portion of the lubricating oil that has passed through the steering clutch 13a is supplied to the steering brake 5a through the third lubricating oil supply path 35 (see arrows in FIG. 2). The flow amount switching valve 43 (see FIG. 1) disposed on the second lubricating oil supply path 33 enters the open state when the steering brake 5a is in the braking state, and enters the closed state when the steering brake 5a is in the non-braking state. As a result, when the steering brake 5a is in the braking state, the steering brake 5a is cooled and lubricated due to the supply of the lubricating oil from the respective second lubricating oil supply path 33 and the third lubricating oil supply path 35. Conversely, when the steering brake 5a is in the non-braking state, the lubrication of the steering brake 5a is maintained mainly due to the supply of the lubricating oil to the steering brake 5a from the third lubricating oil supply path 35. The lubricating oil that has passed through the steering brake 5a is returned to the second lubricating oil recovery path 34.

(Characteristics)

(1) The bulldozer 1 is provided with the first lubricating oil supply path 31, the second lubricating oil supply path 33, the third lubricating oil supply path 35, and the flow amount switching valve 43. The first lubricating oil supply path 31 supplies a portion of the lubricating oil discharged by the hydraulic pump 30 to the steering clutch 13a. The second lubricating oil supply path 33 supplies a portion of the lubricating oil discharged by the hydraulic pump 30 to the steering brake 5a. The third lubricating oil supply path 35 supplies a portion of the lubricating oil that has passed through the steering clutch 13a to the steering brake 5a. The flow amount switching valve 43 is disposed on the second lubricating oil supply path 33 and switches the amount of lubricating oil supplied to the steering brake 5a.

Figure 3:
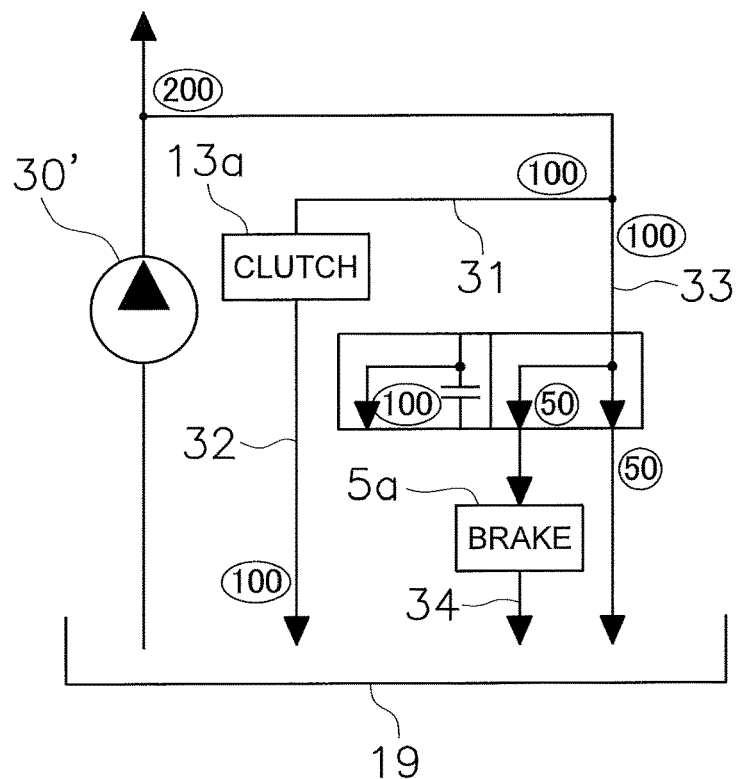
FIG. 3 is a schematic view of a lubricating oil circuit in a conventional lubricating oil supply system.

As indicated in FIG. 3 in the conventional lubricating oil supply system, all of the lubricating oil that has been discharged by the hydraulic pump 30' and has passed through the steering clutch 13a is returned to the recovery tank 19 through the first lubricating oil recovery path 32. Therefore, the total amount of the lubricating oil required by the steering clutch 13a and the lubricating oil required by the steering brake 5a must be discharged by the hydraulic pump 30. The numbers depicted in FIG. 3 indicate examples of amounts of lubricating oil flowing through each of the paths.

Figure 4:
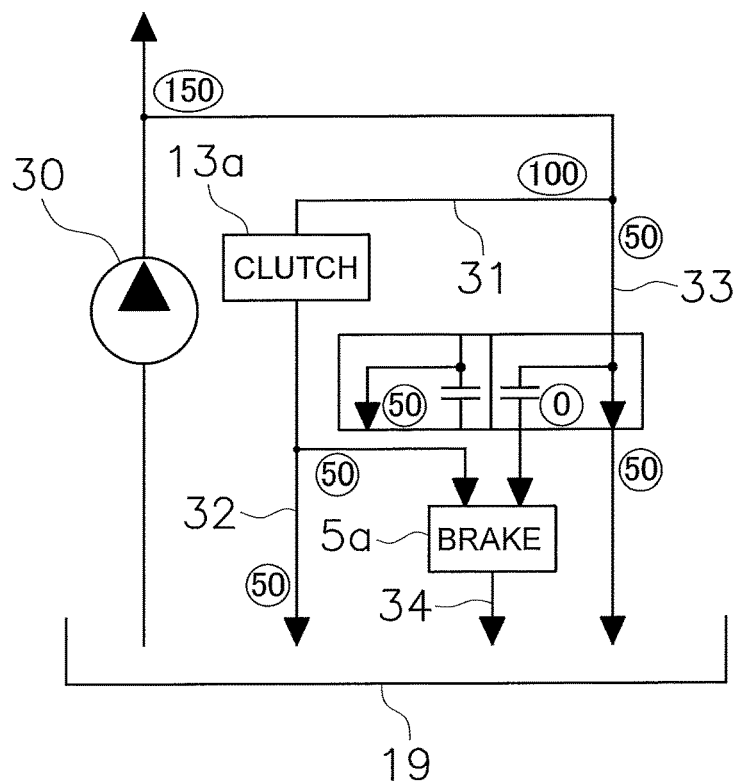
FIG. 4 is a schematic view of a lubricating oil circuit in a lubricating oil supply system according to an embodiment.

However, as indicated in FIG. 4 in the lubricating oil supply system according to the present embodiment, a portion of the lubricating oil that has been discharged by the hydraulic pump 30 and that has passed through the steering clutch 13a is supplied to the steering brake 5a through the third lubricating oil supply path 35. Therefore, the lubricating oil discharged by the hydraulic pump 30 can be used effectively because a portion of the lubricating oil supplied to the steering clutch 13a can be reused in the steering brake 5a. As a result, the capacity of the hydraulic pump 30 can be reduced because the supply amounts of the lubricating oil to the steering clutch 13a and the steering brake 5a can be reduced. The numbers depicted in FIG. 4 indicate examples of amounts of lubricating oil flowing through each of the paths.

While the amount of lubricating oil is set from the point of view of reducing the capacity of the hydraulic pump 30 in FIG. 4, the supply amounts of the lubricating oil to the steering clutch 13a and the steering brake 5a can be increased if the capacity of the hydraulic pump 30 is maintained at the same level as that of the hydraulic pump 30' in FIG. 3. As a result, the capacities of the steering clutch 13a and the steering brake 5a can be increased.

(2) The brake housing 46 is spaced away from the center line CL of the plurality of first clutch disks 42 and the plurality of second clutch disks 43, in the axial direction parallel to the shaft center 14S of the output shaft 14a. As a result, the first lubricating oil recovery path 32 can be provided in a manner that does not interfere with the steering brake 5a.

(3) The plurality of fixed plates 47 and the plurality of brake disks 48 are spaced further away from the input shaft 12 than the plurality of first clutch disks 42 and the plurality of second clutch disks 43 in the radial direction perpendicular to the shaft center 14S of the output shaft 14a. As a result, the lubricating oil that has passed through the steering clutch 13a can be supplied effectively to the steering brake 5a with a centrifugal force.

(Modified Examples)

The present invention is not limited to the above embodiment and various changes and modifications may be made without departing from the spirit of the invention.

While the flow amount switching valve 43 switches between the open state and the closed state in the above embodiment, a small amount of the lubricating oil may be allowed to pass through even in the closed state by providing an orifice, and furthermore, the entire amount of the lubricating oil is not required to pass through even in the open state.

While the brake housing 46 is spaced away from the center line CL of the plurality of first clutch disks 42 and the plurality of second clutch disks 43 in the axial direction in the present embodiment, the brake housing 46 overlap the center line CL of the plurality of first clutch disks 42 and the plurality of second clutch disks 43.

While the plurality of fixed plates 47 and the plurality of brake disks 48 are spaced further away from the output shaft 14a than the plurality of first clutch disks 42 and the plurality of second clutch disks 43 in the radial direction in the above embodiment, the invention is not limited in this way.

INDUSTRIAL APPLICABILITY

The present invention is useful in the field of construction machinery according to the bulldozer as in the present invention because the lubricating oil can be used effectively.

What is claimed is:

1. A bulldozer comprising:
    a steering clutch configured to transmit or cut off a rotational force of an input shaft to an output shaft;
    a steering brake configured to brake the output shaft;
    a hydraulic pump configured to discharge a lubricating oil;
    a first lubricating oil supply path configured to supply a portion of the lubricating oil discharged by the hydraulic pump to the steering clutch;
    a second lubricating oil supply path configured to supply a portion of the lubricating oil discharged by the hydraulic pump to the steering brake;
    a third lubricating oil supply path configured to supply, to the steering brake, a portion of the lubricating oil that has passed through the steering clutch; and
    a flow amount switching valve disposed on the second lubricating oil supply path, the flow amount switching valve being configured to switch an amount of the lubricating oil supplied to the steering brake.

2. The bulldozer according to claim 1, wherein the steering clutch has
    a clutch housing coupled to the output shaft,
    a plurality of first clutch disks fixed to the clutch housing, and a plurality of second clutch disks that rotate with the input shaft;

the steering brake has
a brake housing,
a plurality of fixed plates that are fixed to the brake housing, and
a plurality of brake disks that rotate with the output shaft; and the plurality of fixed plates and the plurality of brake disks are spaced further away from the input shaft than the plurality of first clutch disks and the plurality of second clutch disks along a radial direction perpendicular to the input shaft.

3. The bulldozer according to claim 1, wherein
the steering clutch has
a clutch housing coupled to the output shaft,
a plurality of first clutch disks fixed to the clutch housing, and
a plurality of second clutch disks that rotate with the input shaft;

the steering brake has
a brake housing,
a plurality of fixed plates that are fixed to the brake housing, and
a plurality of brake disks that rotate with the output shaft; and the brake housing is spaced away from a center line of the plurality of first clutch disks and the plurality of second clutch disks along an axial direction parallel to the input shaft.

* * * * *